Figure 1:
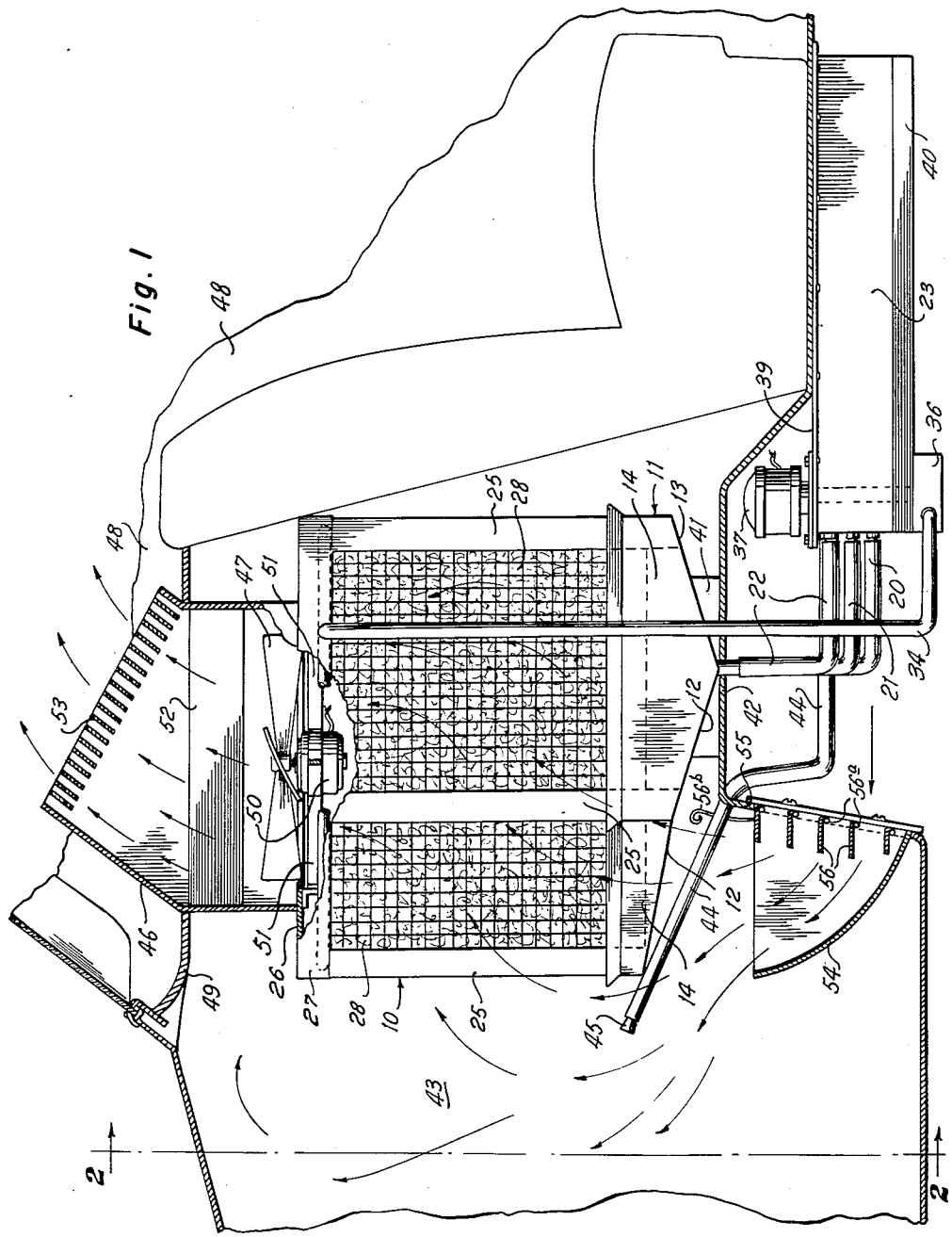

June 26, 1956 C. R. CARNEY, JR 2,751,837
EVAPORATIVE COOLING APPARATUSES
Filed Dec. 1, 1952 3 Sheets-Sheet 2

Charles R. Carney, Jr.
INVENTOR.

BY
ATTORNEY

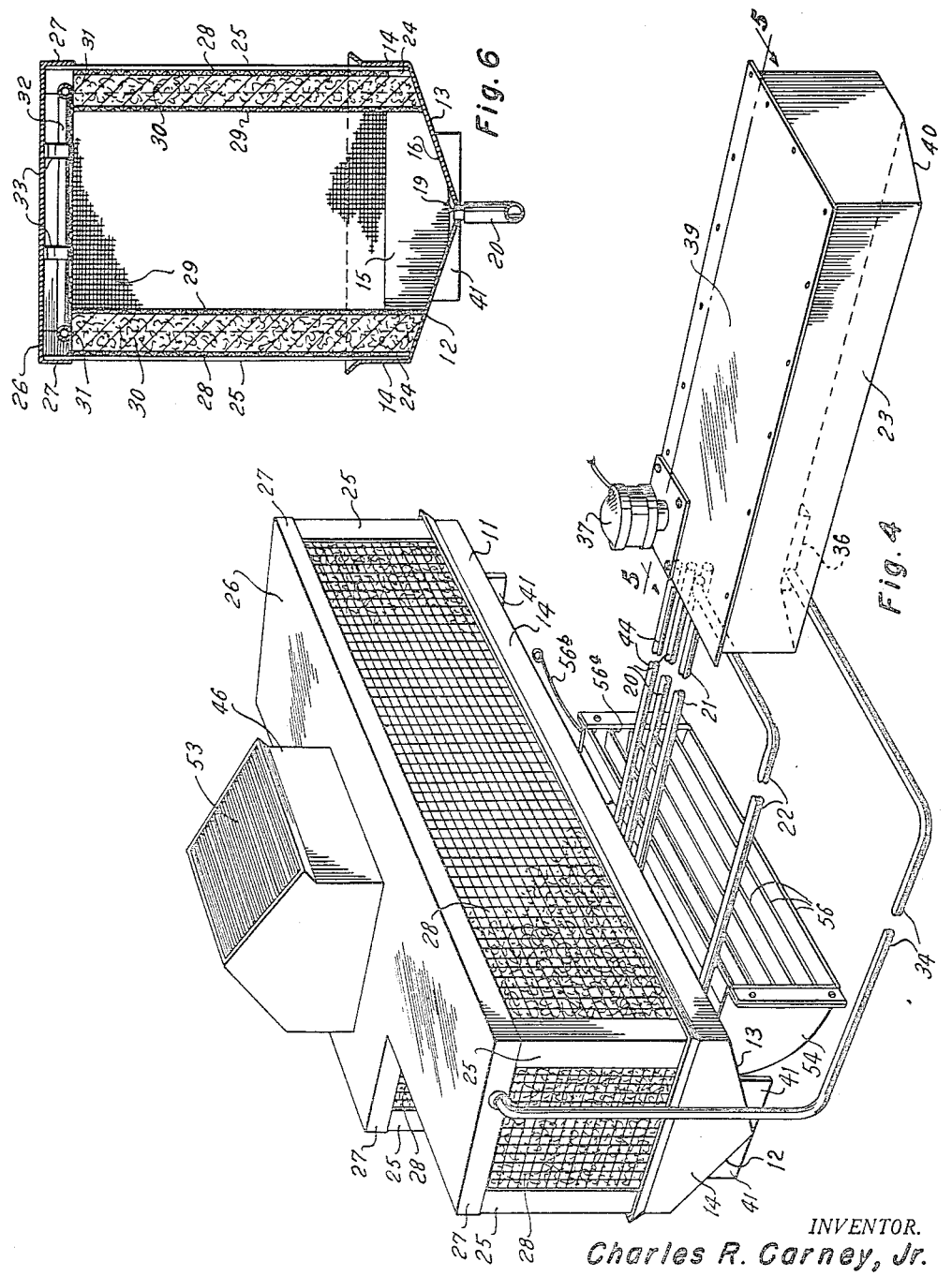

United States Patent Office 2,751,837
Patented June 26, 1956

2,751,837

EVAPORATIVE COOLING APPARATUSES

Charles R. Carney, Jr., Dallas, Tex.

Application December 1, 1952, Serial No. 323,460

4 Claims. (Cl. 98—2)

This invention relates to evaporative cooling apparatuses and more particularly to an evaporative cooling apparatus for cooling the interior of an automobile.

An evaporative cooling apparatus for automobiles must be capable of functioning properly under all traffic and temperature conditions in order to maintain the temperature within the automobile at a comfortable level. Accordingly, the apparatus must be capable of functioning properly when the automobile is at rest or moving slowly, and must provide moist evaporating surfaces of sufficient area so that the amount of heat extracted from a given value of air due to the evaporation of water will be sufficiently great to lower the temperature of the air to comfortable level even during the hottest days. Moreover, it is desirable that the flow of air through the apparatus and the car be effected without the use of electric fans during operation of the automobile at night or while traveling at high speeds on the highways, and that a fan be provided to draw air through the moist pads when the automobile is traveling at normal or slow speeds or when stopped. Furthermore, it is desirable that the evaporative cooler apparatus be capable of being easily installed in an automobile and with a minimum of structural alteration of the automobile.

Accordingly, an object of the invention is to provide a new and improved evaporative cooling apparatus for automobiles.

Another object of the invention is to provide a new and improved evaporative cooler apparatus which presents a maximum area of moist evaporating surfaces to air passing therethrough to obtain maximum cooling of the air.

Still another object of the invention is to provide an evaporative cooler apparatus whose evaporative pad cabinet may be mounted in the rear deck compartment of an automobile so that air passing through the evaporative pads on all sides of the compartment is drawn from the rear deck compartment to which air is admitted through an air scoop or opening provided in the floor or walls of the rear deck compartment.

A further object of the invention is to provide an evaporative cooler apparatus of the kind described in which the flow of air is provided by the air opening or scoop during high speed highway driving and during night driving, and in which the flow of air is augmented by a fan placed in operation to draw air through the cooler when the flow of air through the evaporative cooler apparatus effected by the air opening or scoop is not sufficient to maintain comfortable temperature conditions within the passenger compartment of the automobile.

A still further object of the invention is to provide an evaporative cooler apparatus of the kind described in which air is drawn from the rear deck compartment of an automobile through the evaporative pads of a cabinet and expelled through an aperture in the rear seat shelf of the automobile.

Figure 2:
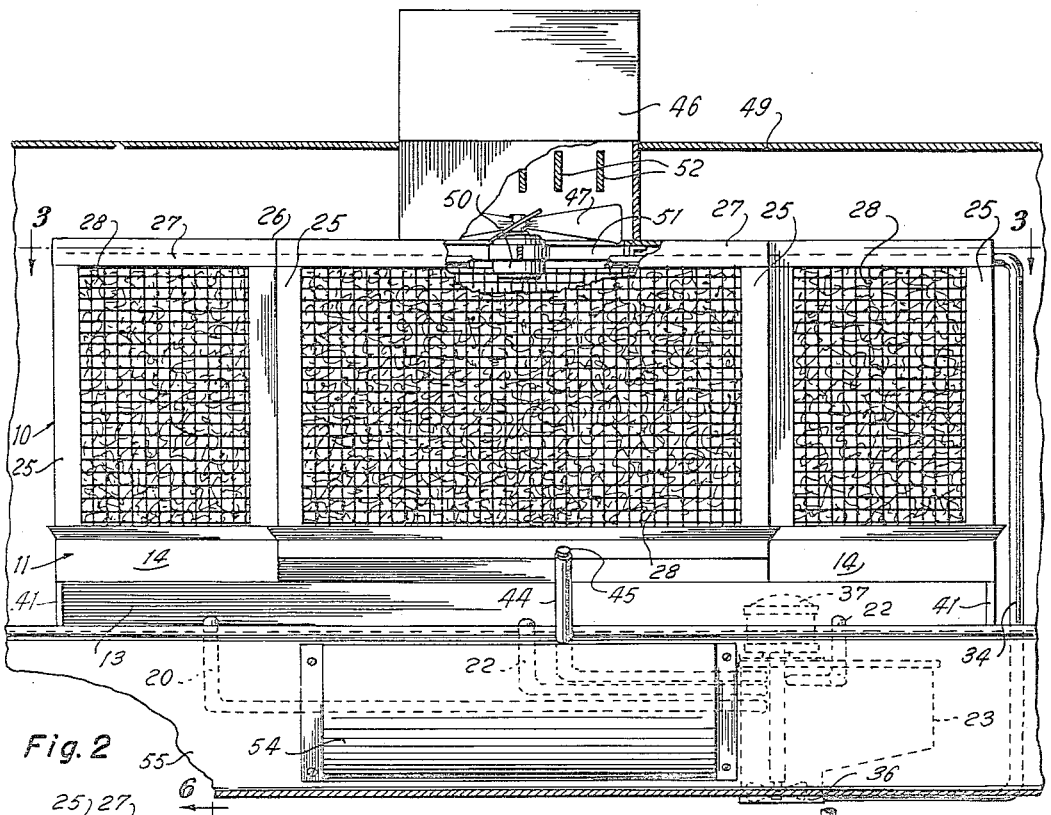
Figure 3:
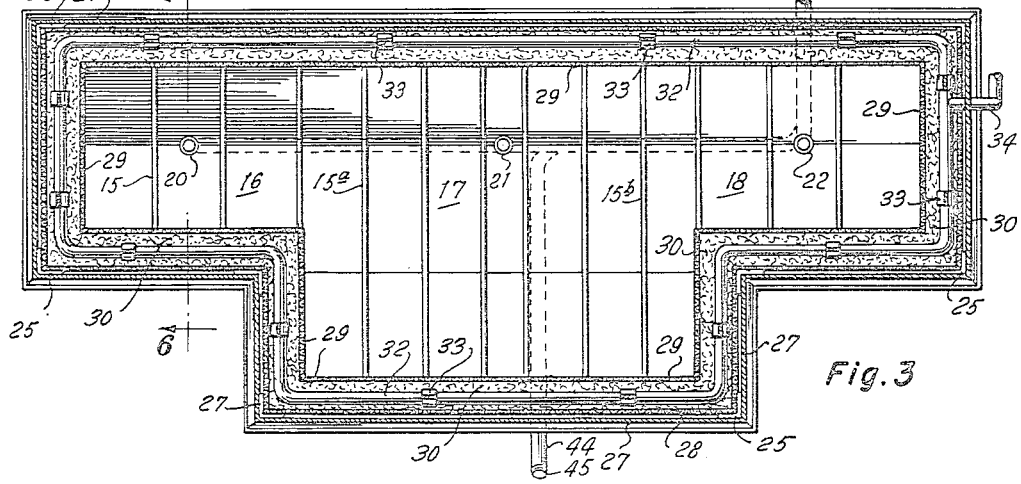
Figure 5:
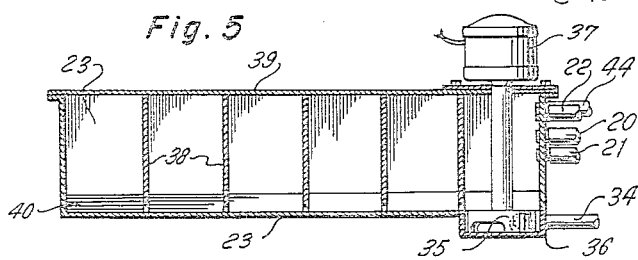

Further objects and advantages of the invention will readily be apparent from the reading of the following description of a device constructed in accordance with the invention, and reference to the accompanying drawings thereof, wherein:

Figure 1 is a side plan view of the evaporative cooling apparatus, with some parts shown in section or broken away, showing the apparatus installed in an automobile, Figure 2 is a sectional view, with some parts of the apparatus shown broken away, taken on the line 2—2 of Figure 1, Figure 3 is a horizontal sectional view taken on the line 3—3 of Figure 2, Figure 4 is a perspective view of the evaporative cooling apparatus, Figure 5 is a vertical sectional view taken on the line 5—5 of Figure 4, and Figure 6 is a vertical sectional view taken on the line 6—6 of Figure 3.

In the drawings, the numeral 10 designates the evaporative pad cabinet of a cooling apparatus which includes a trough 11 of substantially T-shape having downwardly and inwardly converging bottom walls 12 and 13 extending from a continuous vertical wall 14. The trough is provided with a plurality of transverse baffles 15. Two of the baffles 15a and 15b have lower edges which abut the bottom walls to divide the trough into three drain compartments 16, 17 and 18. The other baffles have the lowermost portion 19 of their edges spaced above the bottom walls so that water may flow in the compartments 16, 17 and 18 to the drain pipes 20, 21 and 22, respectively, which empty into a storage tank 23. The baffles prevent splashing of the water in the drain trough when the car is in motion. Resting on the upper portions of the bottom walls 12 and 13 is a T-shaped frame 24, portions of which can be seen in Figure 6. Vertical angle members 25 extend upwardly from the frame 24 at each corner thereof and a cover 26 is supported thereby. The cover 26 has a dependent flange 27 of the same configuration as that of the frame 24 which extends over and abuts the upper portions of the angle members, and which may be secured thereto by screws or in any other suitable manner. An outer screen 28 and an inner screen 29, which may be made of wire, are disposed between the drain trough 11 and the cover 26 to form a vertical T-shaped chamber in which is disposed a mass 30 of shavings or other fibrous material forming pads or masses through which air may pass. If desired, the rectilinear sections of the pads may be separately formed.

The mass or pad 30 is moistened by water dripping through a plurality of apertures 31 provided in the bottom of a closed T-shaped drip pipe 32 disposed over the mass 30 and secured to the cover 26 by straps 33. The drip pipe is connected to the outlet of a pump 35 disposed in the sump 36 of the storage tank 23 by a pipe or conduit 34. The storage tank is secured beneath and to the floor of the automobile in any suitable manner, and the pump 35 is driven by an electric motor 37 mounted in the water storage tank. The water storage tank is provided with a plurality of spaced transverse baffles 38 which depend from the top 39 of the tank and whose lower edges are spaced slightly above the inclined bottom 40 of the tank so that water may flow downwardly along the bottom to collect in the sump 36. The baffles 38 are provided to prevent splashing and undue movement of the water while the automobile is in motion.

The drain trough 11 is provided with feet 41 which support the cabinet on the raised or rear axle hump portion 42 of the floor of the rear deck compartment 43 of an automobile, and the various water drain and supply pipes extend through suitable apertures in the floor between the cabinet and the storage tank. The filling pipe 44 of the storage tank also extends through a suitable aperture in the floor into the rear deck compartment so that the tank may be easily filled through the end of the pipe located in the compartment and closed by a cap or stopper 45.

A duct or fan housing 46 is rigidly secured to the cover 26 of the cabinet 10 in any suitable manner over an opening therein so that a fan 47 may draw air from the interior of the cabinet through the fan housing and into the passenger compartment 48 of the automobile. The fan housing extends into the passenger compartment through a suitable aperture in the rear seat shelf 49 of the automobile. The T-shape of the cabinet permits the fan housing to be of sufficient size to provide a large air flow passage.

The fan 47 is driven by an electric motor 50 secured to hangers on the cover 26 of the cabinet by straps 51 secured to the cover, or in any other suitable manner. The fan housing is provided with a plurality of vanes 52 above the fan which extend longitudinally with respect to the automobile, while the outlet mouth at the upper end of the fan housing is provided with a plurality of vanes 53 which extend transversely with respect to the automobile and with respect to the vanes 52. The two sets of vanes 52 and 53 serve to prevent undue turbulence of the air passing through the fan housing, and also to direct the stream of air entering the passenger compartment along the windows and to prevent any objectionable blasts of air anywhere inside the passenger compartment.

An air scoop 54 is secured in a suitable opening provided in the nearly vertical rear portion 55 of the rear axle hump 42 in the floor of the rear deck compartment 43 of the automobile, and is secured thereto by screws or in any other suitable manner. The forward open end of the scoop is provided with vanes 56 which prevent undue turbulence in the air passing through the scoop into the rear deck compartment. It has been found that an air scoop located in this position is not splashed to any substantial extent by water or mud from wet pavements and, therefore, splash guards are not needed to prevent splashing of water or mud from roads into the rear deck compartment, although they could be provided if it were desirable or necessary. If desired, the vanes 56 may be pivotally mounted at their ends on pins 56a and their position controlled by a pull wire 56b connected to the vanes and operable from the rear deck compartment or from the operator's seat as desired.

In use, while the automobile is traveling at high speeds on the highway, the fan motor may be disconnected from the electric current supply system of the automobile by a switch (not shown), preferably mounted on the dashboard within reach of the driver. The pump motor 37, however, is connected to the electric current supply system by a similar switch (not shown) similarly located so that water is pumped from the storage tank 23 into the drip pipe 32 and drips through the holes 31 in the drip pipe on top of the porous perforate mass or pad 30 and thus maintains it constantly moist. Excess water drips from the mass or pad 30 into the drain trough 11 and thence through one of the drain pipes 20, 21 and 22 back into the storage tank.

The movement of the automobile at high speeds causes air to flow through the air scoop 54, which opens forwardly into the rear deck compartment 43 and, as a result, a pressure differential is created between the interior of the rear deck compartment and the passenger compartment of the automobile since the window wing vents at the forward end of the passenger compartment are kept open, and at low speeds the front door windows are also kept open about an inch or two from the top, to create a drop in pressure within the passenger compartment due to the Venturi effect. The pressure differential thus created between the passenger compartment and the rear deck compartment exists on all sides of the cabinet 10, of course, so that air flows into the interior of the cabinet through the mass or pad 30 at all sides of the cabinet. As a result, a very large area of moistened surfaces of the fibrous material of the pad is exposed to the air as it passes through the pad and an optimum amount of water is evaporated, resulting in a large drop in temperature. The use of the rear deck compartment as the location of the cabinet also permits the air to pass into the interior of the cabinet through the pad 30 on all sides of the cabinet, thus affording a very effective air passage through the pad, so that the resistance encountered by the air in passing therethrough is kept at a minimum, permitting a comparatively greater volume of air to flow through the cabinet at any given speed of the automobile.

The air cooled by the evaporation of the water in the pad 30 then pases upwardly through the duct or fan housing 46 into the passenger compartment and flows through the passenger compartment and past the rear side windows forwardly to the openings provided by the wing vents and the front door windows. The air absorbs heat from the windows and the passenger compartment in this forward movement through the passenger compartment, thus maintaining the temperature in the passenger compartment at a comfortable level.

If the automobile is being driven through heavy city traffic or at normal speeds, the fan motor is connected to the electric current supply system of the automobile to cause the fan 47 to rotate. The fan draws air from the interior of the cabinet and forces it out through the fan housing into the passenger compartment, and thus increases the amount of air drawn through the moist pad 30 from the rear deck compartment and into the passenger compartment. Again, the positioning of the cabinet 10 in the rear deck compartment serves to permit the flow of air through the pads at all sides of the cabinet and thus results in the flow of a maximum volume of air over a maximum total area of moist surface provided by the pad to effect a maximum cooling of the passenger compartment. Moreover, it is found that air tends to "pile up" in front of an obstruction, such as the pad 30, if it is blown or forced against the pad but that a blower, such as the fan 47, will efficiently draw air through the pad from the rear deck compartment, since the air in the rear deck compartment flows to all sides of the cabinet and is not blasted against any side. In night driving, the fan may usually be kept inoperative, even in city traffic, since the air temperatures are not as high as during the day temperatures and the flow of air through the air scoop, caused by the forward movement of the automobile may be sufficient to maintain a comfortable temperature in the passenger compartment.

It will now be seen that an evaporative cooling system for automobiles or other vehicles has been provided which includes a cabinet 10, having porous pads on all sides thereof which is disposed in the rear deck compartment of an automobile, and that the interior of the compartment communicates with the passenger compartment of the automobile through a duct or fan housing 46 extending through an aperture in the rear seat shelf of the automobile. It will also be apparent that air is forced into the rear deck compartment through the air scoop 54 when the automobile is moving forwardly, and that a fan 47 is mounted in the fan housing to augment the rate of flow of air from the rear deck compartment to the passenger compartment.

It will also be seen that a recirculating water system has been provided for keeping the pad 30 moist, which includes the drip pipe 32, the drain trough 11, the storage tank 23 and the water pump 35.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. In a vehicle provided with a rear deck compartment, a passenger compartment, and a substantially horizontal shelf separating said compartments; an evaporative cooling system comprising a cabinet disposed in said rear deck compartment having a closed base and a closed top, frame members mounted on said base supporting said top in spaced relation to said base providing open sides, porous material mounted over said open sides, said sides being spaced from the walls of the rear deck compartment to present a large evaporative surface, a forwardly opening air inlet opening in a wall of said rear deck compartment communicating with the exterior of said vehicle whereby forward movement of said vehicle will cause air to flow through said air inlet opening into said rear deck compartment to build up air pressure therein and thus create a pressure differential between the interior of the rear deck compartment and the passenger compartment, outlet means mounted in said cabinet top extending through said horizontal shelf into said passenger compartment, the deck compartment functioning as a plenum chamber to distribute air evenly over the open sides of the cabinet and pass the same, because of said pressure differential, through the porous material into the interior of the cabinet and then through said outlet means into said passenger compartment, means in said cabinet for moistening the porous material from the upper end by gravity flow through the porous material, and a trough in said base for collecting water falling through said porous material.

2. The device of claim 1 including blower means in said outlet means for augmenting air flow from the interior of the cabinet into the passenger compartment.

3. The device of claim 1, said means for moistening said porous material including a water-storage tank mounted on said vehicle at a point spaced from said cabinet, a conduit in said cabinet having downwardly opening apertures disposed over said material and a pump and conductor for forcing water from said storage tank to said conduit.

4. The device of claim 3 also provided with a conduit connecting said trough with said water-storage tank.

References Cited in the file of this patent

UNITED STATES PATENTS

| | | |
|---|---|---|
| 1,452,313 | Roos | Apr. 17, 1923 |
| 1,826,471 | James | Oct. 6, 1931 |
| 2,108,391 | Rice | Feb. 15, 1938 |
| 2,169,664 | Shifflett | Aug. 15, 1939 |
| 2,180,760 | Mayo | Nov. 21, 1939 |
| 2,180,943 | Peo | Nov. 21, 1939 |
| 2,285,725 | Kneedler | June 9, 1942 |
| 2,294,036 | Kettering | Aug. 25, 1942 |
| 2,380,586 | Essick | July 31, 1945 |
| 2,431,146 | Steele | Nov. 18, 1947 |
| 2,520,623 | Collins | Aug. 29, 1950 |